Nov. 23, 1965  M. KAUFMAN  3,219,229
SHEET METAL RECEPTACLE
Filed Sept. 7, 1961  2 Sheets-Sheet 2
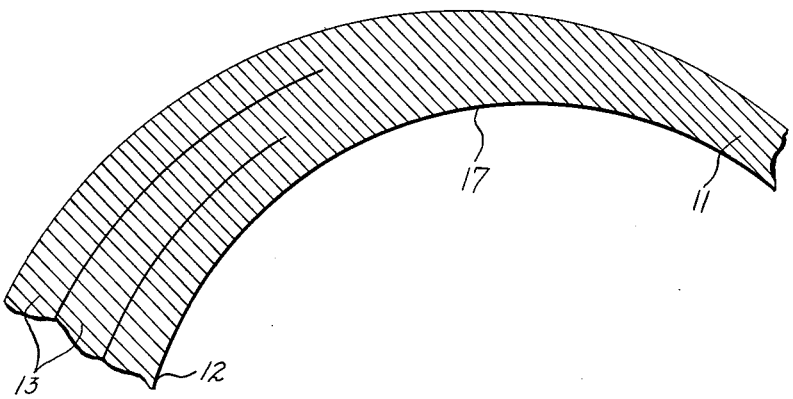
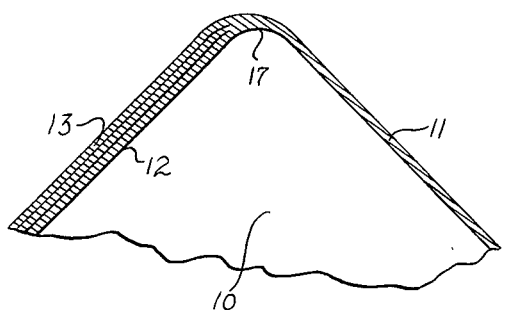
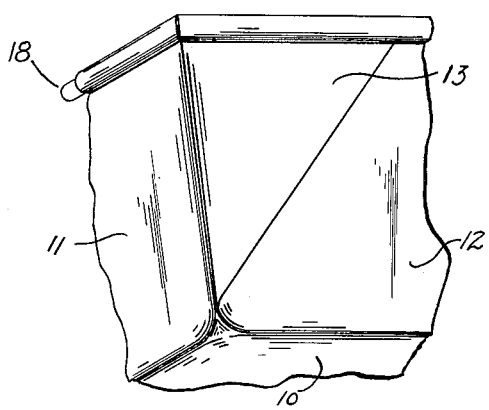
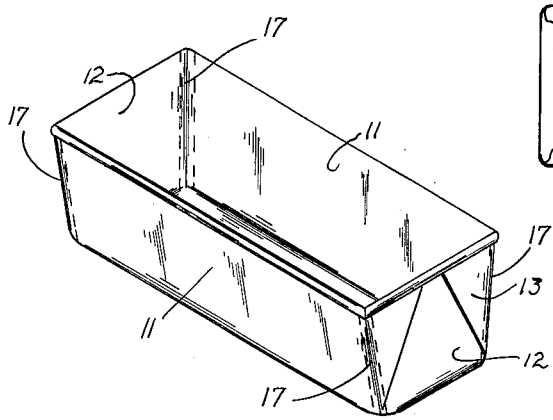
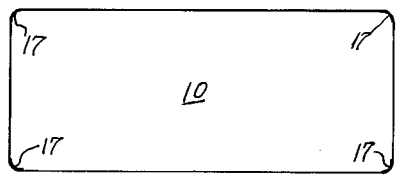
INVENTOR.
BY MORRIS KAUFMAN

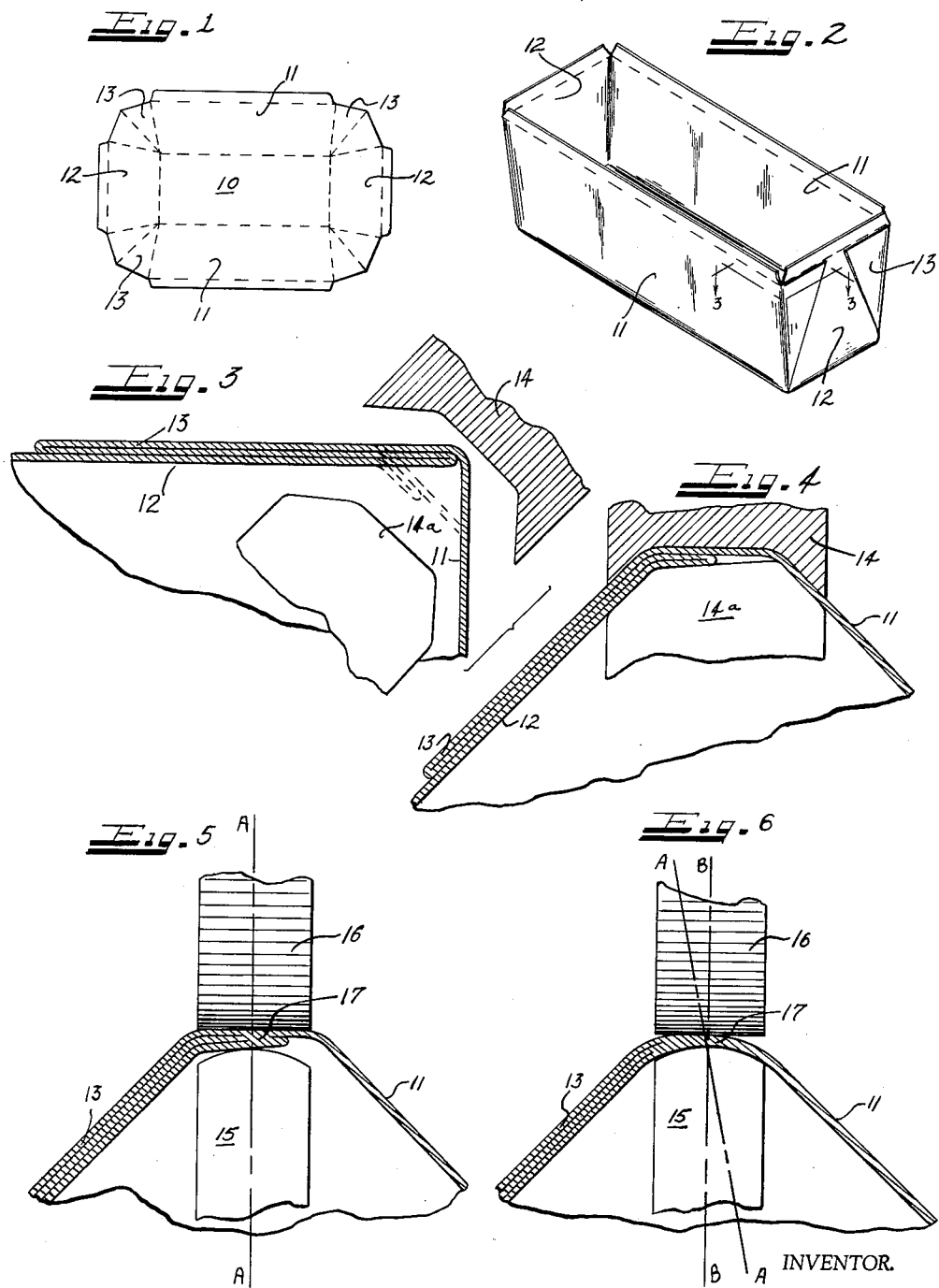

United States Patent Office 3,219,229
Patented Nov. 23, 1965

3,219,229
SHEET METAL RECEPTACLE
Morris Kaufman, Morton Grove, Ill., assignor to Ekco Products Company, Chicago, Ill., a corporation of Delaware
Filed Sept. 7, 1961, Ser. No. 136,545
2 Claims. (Cl. 220—62)

This invention relates to improvements in the manufacture and production of metal receptacles, such, for example, as folded type rectangular bread loaf baking pans formed from a single blank of sheet metal or the like in which a certain amount of fullness or excess of material generated at the upright corners of the pan is commonly taken care of by folding the excess material flat against a wall of the pan to create corner folds or laps of two-ply thickness.

It is a primary object of this invention to so construct a folded type pan of the character indicated in which the two plies of each corner fold and the pan wall overlapped by said plies are bonded together by a fused joint throughout a strip-like area extending along the line of bend between each ply of the corner fold and the pan wall of which it forms a continuation whereby the corners of the pan coincident with said line of bend are given added rigidity and consequent protection against distortion under stress of impacts encountered along said corners while said pans are in actual service.

It is also an object of this invention to provide a pan of this type wherein the strip-like area representing the fused joint, and marginal portions of the pan walls adjacent the upright boundaries of said joint are merged along inwardly facing concavely curved lines having their axes of curvature lengthwise of the fused joint whereby the interior of the pan is free of pockets in which foreign matter might otherwise collect and interfere with maintenance of sanitary conditions within the pan.

With the above and other objects in view, as will be apparent, this invention consists in the construction, combination and arrangement of parts, all as hereinafter more fully described, claimed and illustrated in the accompanying drawing, wherein:

FIG. 1 is a plan view of a sheet metal blank for production of a pan in accordance with this invention, while said blank is in a flat state.

FIG. 2 is an enlarged top perspective view of the blank shown in FIG. 1 illustrating the same as a partially completed folded pan and showing the surplus material at the corners arranged in two ply folds against one of the pan walls of which the innermost ply of said folds forms a continuation.

FIG. 3 is an enlarged fragmentary sectional view taken along line 3—3 of FIG. 2 and showing forming dies in a position preparatory to acting on the pan corner area to deform the same in accordance with the dotted line portion.

FIG. 4 is a similar view showing the corner of the pan in a deformed state under action of the dies in preparation for the production of a fused joint between the plies of the corner folds and the pan wall overlapped thereby.

FIG. 5 is an enlarged section illustrating the method of initially fusing the plies of the corner fold and the pan wall overlapped thereby.

FIG. 6 is a similar view illustrating the method of extending the fused area of the plies of the corner fold with a subsequent welding step and simultaneously smoothening and concavely curving the inner surface of the pan corner along the fused joint.

FIG. 7 is a similar view showing a section through the fused joint resulting from the process illustrated in FIG. 6.

FIG. 8 is a fragmentary bottom perspective view of the pan as it appears subsequent to the formation of an integral outwardly turned closed reinforcing bead along the upper edges thereof.

FIG. 9 is a section showing a magnified view of the zone between the plies of the corner fold and the pan wall overlapped thereby.

FIG. 10 is a top perspective view of the pan in a final state of production.

FIG. 11 is a diagrammatic view of the interior of the pan shown in FIG. 10.

Referring to the drawing, FIG. 1 shows a blank of sheet metal of suitable contour for forming a folded pan in accordance with this invention. As initial steps in the transformation of the blank in accordance with the process of this invention, the blank 10 is bent along fold lines indicated by dotted lines in FIG. 1 to produce a pan having a flat bottom 10 of rectangular plan and upwardly bent side and end walls 11 and 12 respectively. The excess material developed at the corners of the blank 10 is preferably arranged in two ply folds 13 against the outer surface of the pan wall of which the innermost ply of said fold 13 is a continuation.

Subsequent to the operation of initially bending the walls 11 and 12 into the position shown in FIG. 2, the blank 10 is acted on by dies 14 and 14a along the line of bend between the folds 13 and the walls 11 and 12 to deform the corner portion of the pan. Under action of the dies 14 and 14a, as shown in FIG. 4, a marginal area of the plies of the fold 13 and a portion of the pan wall 12 overlapped thereby along one side of the bend between the pan wall 12 and the innermost ply and a marginal area of the pan wall 10 along the opposite side of said bend between pan wall 12 and the innermost ply of the corner lap 13 are flattened and thereby brought into coplanar relation along parallel planes extending obliquely to the pan wall surfaces at the boundaries of said flattened area.

After the corner areas of the pan have been thus flattened, said corner area is next subjected to the action of welding electrodes as shown in FIG. 5, wherein an inner electrode 15 of convexly curved contour is applied to the inner surface of the pan corner area along the bend between the innermost ply of the corner fold 13 and the wall 12 while an outer electrode 16 of flat contour is applied to the outer surface of said corner area directly opposite said inner electrode 15. While the corner area is thus subjected to heavy localized electric current and mechanical pressure of said electrodes 15 and 16, the inner and outer ply of the corner fold 13 and the pan wall 12 of which the inner ply forms a continuation are integrally fused together along a strip-like area or seam as indicated at 17 in FIG. 5 and extending the full length of said line of bend between the folds 13 and the pan walls 11 and 12, as shown in FIG. 10.

While thus joined by the seam 17, the corner area is again subjected to welding temperature under pressure of the electrodes 15 and 16 as shown in FIG. 6 with the pressure applied along a line of force B—B slightly angular to the line of force A—A as applied in the initial welding step shown in FIG. 5 whereby the zone of fusion is spread and of gradually reduced depth in the direction opposite to that direction in which the plies of the corner fold 13 extend away from the seam 17. Simultaneously with the second welding step, the electrodes 15 and 16 are operative to compress and arch the fused joint and to obtain a merger of the surfaces of the pan walls adjoining said fused joint along inwardly facing concavely curved lines about an axis of curvature extending lengthwise of said fused joint.

The pan is thereupon subjected to action of suitable dies effective to produce a spherical contour at the junction between the bottom wall 11 of the pan and the lower limits of the pan walls 12 and 13 adjoining the corners defined by said walls as shown in FIG. 8. Accordingly the interior of the pan is concavely rounded along the junction of said walls 12 and 13 and the junction of the bottom wall 11 and said walls 12 and 13 at the lower end of the junction of said walls 12 and 13 so as to eliminate pockets or crevices in which foreign matter would otherwise collect and render the interior of the pan unsanitary.

A wire 18 encircling the upper limits of the pan is enclosed by an outwardly curled closed bead along the upper edge of the walls 12 and 13 which provides additional reinforcement at the mouth of the pan.

The fused joint thus effected along the corners of a pan unit in accordance with this invention is of such rigidity and durability by reason of the welded connection between the two plies of corner fold material and the pan wall overlapped thereby that the pan blank may be formed of relatively light gauge metal while maintaining resistance to stresses encountered in the use of the pans under normal service conditions.

The pan when thus in a finished state, as shown in FIG. 10, is subsequently cleaned and resurfaced with a protective coating of tin or other suitable material and thus placed in readiness for use as a pan for the baking of bread and the like.

While this invention has been described in connection with a pan of specific shape and design, the features and advantages thereof are of utility in pans of a variety of multi-sided sizes and shapes.

What is claimed is:

1. A folded type sheet metal pan having a bottom wall of rectangular plan and side walls extending upwardly from said bottom wall including first and second walls joined by an integral intervening two ply corner fold bent into overlapping engagement with the outer surface of one of said upwardly extending walls to define a junction between said first and second walls along an upright line coincident with the bending line between said corner fold and said first and second walls, and a fused joint bonding each ply of said corner fold to the other ply and to the wall overlapped by said corner fold, said joint defining a continuous strip-like seam which extends the full length of said line of junction between said first and second walls and of gradually reduced depth in a direction opposite to the direction in which said corner fold extends from said line of junction.

2. A folded type sheet metal pan according to claim 1 wherein areas of said first and second walls bordering said strip-like seam present inwardly facing surfaces which merge with said seam along lines of concave curvature about an axis extending lengthwise of said line of junction between said first and second walls.

References Cited by the Examiner

UNITED STATES PATENTS

| 219,798 | 9/1878 | Bowers | 113—120 |
| 1,153,313 | 9/1915 | Katzinger | 113—120 |
| 1,462,640 | 7/1923 | Hoffman | 113—120 |
| 1,789,981 | 1/1931 | Katzinger | 113—120 |
| 1,870,295 | 8/1932 | Roepke | 113—120 |
| 1,965,648 | 7/1934 | Jackson | 113—120 |
| 2,970,094 | 1/1961 | Reardon | 220—62 |
| 3,038,634 | 6/1962 | Cheeley | 220—62 |

THERON E. CONDON, *Primary Examiner.*

EARLE J. DRUMMOND, LOUIS G. MANCENE,
*Examiners.*